United States Patent
Leon et al.

(10) Patent No.: US 10,017,238 B2
(45) Date of Patent: Jul. 10, 2018

(54) DRAINED FLUID EVACUATION STUB FOR A PROPULSION ASSEMBLY

(71) Applicant: SNECMA, Paris (FR)

(72) Inventors: Alexandre Leon, Moissy Cramayel (FR); Julien Pavillet, Epinay-Sous-Senart (FR); Julien Sayn-Urpar, Montgeron (FR)

(73) Assignee: SNECMA, Paris (FR)

( * ) Notice: Subject to any disclaimer, the term of this patent is extended or adjusted under 35 U.S.C. 154(b) by 86 days.

(21) Appl. No.: 15/039,003

(22) PCT Filed: Nov. 25, 2014

(86) PCT No.: PCT/FR2014/053030
§ 371 (c)(1),
(2) Date: May 24, 2016

(87) PCT Pub. No.: WO2015/082800
PCT Pub. Date: Jun. 11, 2015

(65) Prior Publication Data
US 2016/0376931 A1 Dec. 29, 2016

(30) Foreign Application Priority Data
Dec. 4, 2013 (FR) ...................... 13 62077

(51) Int. Cl.
*B64C 1/14* (2006.01)
*B64D 29/00* (2006.01)
(Continued)

(52) U.S. Cl.
CPC .......... *B64C 1/1453* (2013.01); *B64D 29/00* (2013.01); *F01D 25/32* (2013.01); *F02C 7/30* (2013.01);
(Continued)

(58) Field of Classification Search
CPC ....... F01D 25/32; B64C 1/1453; B64C 29/00; F02C 7/30; G01L 7/00; F05D 2220/323;
(Continued)

(56) References Cited

U.S. PATENT DOCUMENTS 1,784,157 A * 12/1930 Oglesby ................. G09F 21/16
239/171
2,248,308 A * 7/1941 Rice ....................... B64D 37/26
169/45
(Continued)

FOREIGN PATENT DOCUMENTS

DE 102005003436 8/2005
EP 2065303 6/2009
(Continued)

*Primary Examiner* — Reinaldo Sanchez-Medina
*Assistant Examiner* — David Colon Morales
(74) *Attorney, Agent, or Firm* — Womble Bond Dickinson (US) LLP

(57) ABSTRACT

Stub for discharging drained fluids for a propulsion unit. The stub includes a cavity for storing the drained fluids and at least one orifice for discharging the fluids contained in the storage cavity, and elements for measuring a difference in pressure outside the stub and a member for draining the storage cavity. The member is able to move between a first position of closing the discharge orifice and a second position of releasing the orifice, and is configured so as to move from the first to the second position when the difference in pressure is greater than, or equal to, a predetermined value.

11 Claims, 3 Drawing Sheets

(51) Int. Cl.
*F01D 25/32* (2006.01)
*F02C 7/30* (2006.01)
*G01L 7/00* (2006.01)

(52) U.S. Cl.
CPC .......... *G01L 7/00* (2013.01); *F05D 2220/323* (2013.01); *Y10T 137/2012* (2015.04)

(58) Field of Classification Search
CPC ......... F05D 2260/602; F05D 2260/605; F05D 2260/608; F05D 2270/301; F05D 2270/3015; Y10T 137/2012
See application file for complete search history.

(56) References Cited

U.S. PATENT DOCUMENTS

| | | | | |
|---|---|---|---|---|
| 2,408,774 A * | 10/1946 | Goddard | B64D 1/16 | 137/68.13 |
| 2,814,931 A * | 12/1957 | Johnson | F02C 7/232 | 60/39.094 |
| 3,556,444 A * | 1/1971 | Kopp | B64C 29/0091 | 222/108 |
| 3,698,412 A * | 10/1972 | Smyly | F15B 5/00 | 137/487.5 |
| 3,808,796 A * | 5/1974 | Spears, Jr. | F02C 3/14 | 137/512 |
| 4,391,290 A * | 7/1983 | Williams | F01D 11/24 | 137/340 |
| 4,463,774 A * | 8/1984 | Gorges | B64C 1/1453 | 137/238 |
| 4,506,851 A * | 3/1985 | Gupta | B64C 1/1453 | 137/244 |
| 4,715,561 A * | 12/1987 | Spinosa | B64C 1/1453 | 137/430 |
| 4,768,542 A * | 9/1988 | Morris | F16T 1/14 | 137/204 |
| 5,062,441 A | 11/1991 | Glukhov | | |
| 5,095,617 A * | 3/1992 | Costa | F01M 13/00 | 29/513 |
| 5,104,069 A * | 4/1992 | Reising | B64D 1/16 | 244/129.1 |
| 5,285,636 A | 2/1994 | Mayo et al. | | |
| 5,552,576 A * | 9/1996 | Giamati | B64C 1/1453 | 219/201 |
| 5,655,732 A * | 8/1997 | Frank | B64C 1/1453 | 239/171 |
| 5,996,938 A * | 12/1999 | Simonetti | B64C 1/1453 | 244/129.1 |
| 6,179,249 B1 | 1/2001 | Canadas | | |
| 6,425,554 B1* | 7/2002 | Moreland | B64C 1/1453 | 244/1 R |
| 6,571,562 B2* | 6/2003 | Wilcox | F01M 11/04 | 244/129.1 |
| 7,299,817 B2* | 11/2007 | Gisler | B64G 1/286 | 137/78.5 |
| 7,803,218 B2* | 9/2010 | Armstrong | A62B 7/14 | 251/61.4 |
| 7,926,505 B2* | 4/2011 | Hoffjann | B64D 11/02 | 137/192 |
| 8,272,597 B2* | 9/2012 | Kennedy | B64D 11/02 | 244/118.5 |
| 8,328,504 B2* | 12/2012 | Russell | B64D 29/00 | 244/129.1 |
| 8,511,056 B2* | 8/2013 | Handley | B64C 1/1453 | 60/39.08 |
| 8,567,174 B2* | 10/2013 | Burkitt | F01D 25/32 | 251/94 |
| 9,004,093 B2* | 4/2015 | Burd | B64D 11/04 | 137/115.16 |
| 2013/0193271 A1* | 8/2013 | Otero | B64C 1/1453 | 244/136 |
| 2013/0205745 A1* | 8/2013 | Detry | F01D 25/20 | 60/39.08 |
| 2014/0034146 A1* | 2/2014 | Rossi | F01D 25/18 | 137/81.1 |

FOREIGN PATENT DOCUMENTS

| | | |
|---|---|---|
| FR | 2757823 | 7/1998 |
| WO | WO-2012116739 | 9/2012 |

* cited by examiner

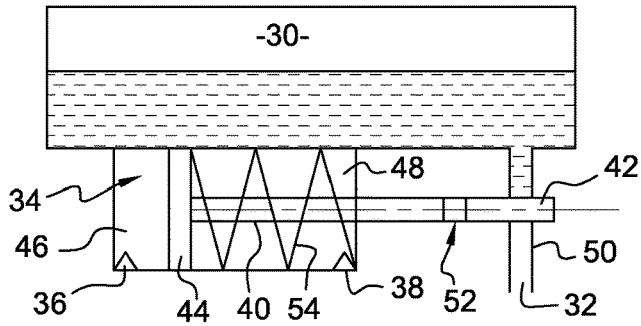
Fig. 6
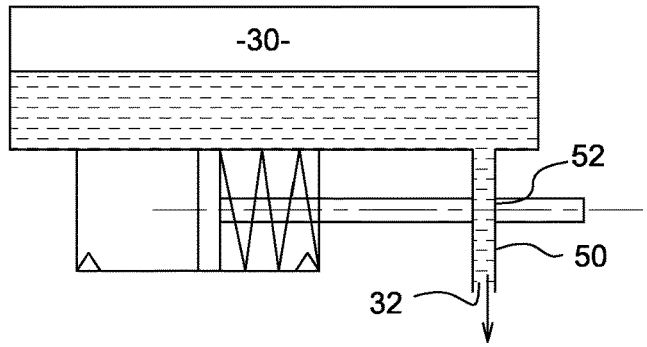
Fig. 7
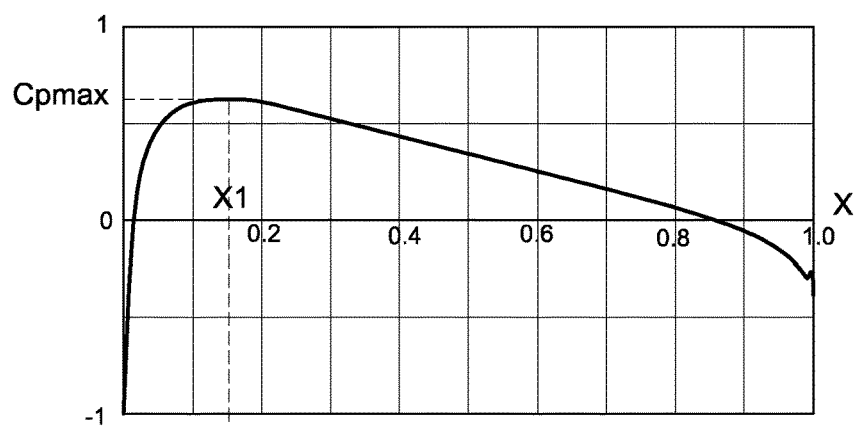
Fig. 8
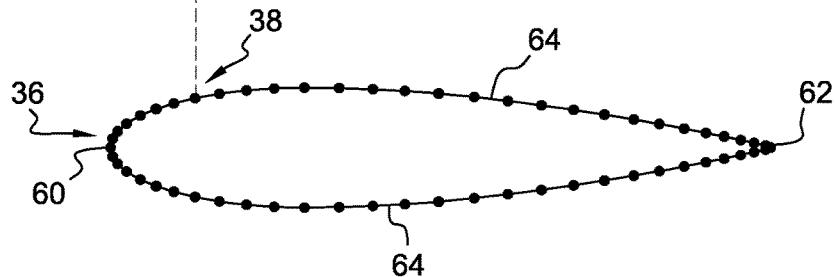

DRAINED FLUID EVACUATION STUB FOR A PROPULSION ASSEMBLY

TECHNICAL FIELD

The present invention relates to a stub for discharging drained fluids for an aircraft propulsion unit comprising in particular an engine (such as a turbojet engine or a turboprop engine) surrounded by a nacelle.

PRIOR ART

An aircraft propulsion unit is in general equipped with means for draining fluids (oil, water and/or fuel) from the engine in order to prevent these fluids accumulating and interfering with the functioning of the engine. The oil and fuel are drained by means of dynamic seal technologies (pumps, AGB, metering devices, actuators, etc.) not affording a perfect seal. It is therefore necessary to drain the fluids that pass through the dynamic seals in order to prevent leakages in the engine. The water is drained in order to avoid retention zones, which often cause corrosion.

In the prior art, the drained fluids may be discharged directly outside. The means for draining fluids from the engine may also be connected by conveying means, such as ducts, to a retention box comprising a drained-fluid storage cavity. This retention box is situated in the propulsion unit. It is fixed to the engine and is in general situated at the lower part of the propulsion unit so that the drained fluids flow by gravity in the conveying means as far as the storage cavity.

The propulsion unit further comprises a drainage stub for discharging the drained fluids to the outside. This stub is carried by the nacelle and projects towards the outside of the nacelle. It is also situated at the lower part of the propulsion unit, opposite the retention box, and recovers fluids emerging from the box. The stub comprises a bottom end comprising an orifice for discharging fluids to the outside of the nacelle. When the storage cavity of the retention box is emptied, the fluids are discharged to the opening in the stub and then discharged to the outside of the propulsion unit.

However, the volume of the retention box is limited (intentional limitation of the volume in order to limit the space requirement in the engine environment). The retention box cannot therefore indefinitely collect the drained fluids and some aircraft constructors require that fluids should not be released when the aircraft is on the ground and in normal operation. One solution therefore consists of draining the retention box when the aircraft is in flight, this drainage being able to be controlled automatically by an engine computer (FADEC) or particular pressure conditions in an oil or fuel system.

However, this solution is not entirely satisfactory since, in the absence of a lack of command, the retention box is not emptied and fluids may be discharged from the box through its overflow when the aircraft is on the ground.

The present invention proposes a simple, effective and economical solution to this problem by means of a system for retaining drained fluids of a propulsion unit, which is equipped with an autonomous drainage, that is to say which functions without the intervention of the engine computer or without the measuring of pressure on a system of the engine.

DISCLOSURE OF THE INVENTION

To this end the invention proposes a stub for discharging drained fluids for a propulsion unit, this stub comprising a cavity for storing the drained fluids and at least one orifice for discharging the fluids contained in the storage cavity, characterised in that it comprises means for measuring a difference in pressure outside the stub and a member for draining the storage cavity, this member being able to move between a first position of closing the discharge orifice and a second position of releasing this orifice, the member being configured so as to move from the first to the second position when said difference in pressure is greater than a predetermined value.

The invention is particularly advantageous since it makes it possible to use a pressure difference such as the external dynamic pressure and therefore the velocity of the aircraft to trigger the drainage of the retention stub and the discharge of fluids. This is because the dynamic pressure outside the stub varies according to the velocity of the aircraft. When the aircraft is at rest, the dynamic pressure is zero and the member is in its first position. The more the velocity of the aircraft increases, the more the dynamic pressure increases. The stub is designed so that its drainage is actuated when the dynamic pressure has reached a certain threshold, that is to say when the aircraft has reached a certain velocity in flight (the member is then in its second position). Thus the drainage of the stub is carried out in flight autonomously, which limits the risk of loss of drained fluids when the aircraft is on the ground.

Advantageously, the stub comprises a first means for measuring the total pressure outside the stub and a second means for measuring the static or pseudo-static pressure outside the stub. In aeronautics, the dynamic pressure is added to the static pressure to give the total pressure. The dynamic pressure is equal to the difference between the total pressure and the static pressure. The difference between the static pressure and the pseudo-static pressure will be detailed hereinafter. The "pseudo-static" pressure is the total pressure at the site of maximum negative pressure around an aerodynamic profile, which corresponds to the minimum total pressure, which is lower than the static pressure. This negative pressure increases with the velocity of the aircraft.

According to one embodiment of the invention, the member is able to move in translation in a recess in the stub and comprises or carries a transverse element separating two chambers inside the recess, a first chamber being connected to said first pressure-measuring means and a second chamber being connected to said second pressure-measuring means. The first chamber is thus subjected to the total pressure and the second chamber is subjected to the static or pseudo-static pressure.

The member may be acted on in its first position by resilient return means. In a particular embodiment of the invention, the dynamic pressure exerts on the transverse element a force that must be greater than the return force of the resilient means so that the member moves from its first to its second position.

The member and its element may be designed so that the member is held in its first, closed position when the pressure difference between the two chambers is less than 6 kPa (which corresponds to a speed of air flow around the stub of approximately 80 m·s$^{-1}$), and is held in its second, open position when the pressure difference between the two chambers is greater than 12 kPa (approximately 120 m·s$^{-1}$). Between these values, the member can move from the first to the second position, and vice versa.

The first and second pressure-measuring means may each comprise an air-passage orifice emerging outside the stub.

The first measuring means is preferably connected to the first chamber by a duct comprising at least two parts, one of which is inclined or perpendicular with respect to the other.

This limits the risk of particles liable to enter the orifice in the first pressure-measuring means reaching the first cavity and interfering with the measurement of dynamic pressure. These particles are intended to be trapped in the duct.

The stub according to the invention preferably has an aerodynamic profile such as an NACA profile of the biconvex symmetrical type.

The NACA profile accelerates the fluid very locally, which causes a local negative pressure. Likewise, the NACA profile slows down the fluid very locally on the stop surface, which causes local overpressure. The difference in pressure between the minimum pressure point and the maximum pressure point on the profile therefore becomes greater than the dynamic pressure. For example, in the case of a theoretical NACA0018 profile, this pressure difference can be calculated as being greater than or equal to 1.6 times the dynamic pressure. This pressure difference serves to control the opening mechanism by means of application surfaces. This has the advantage of increasing the available control pressure, and therefore gaining in compactness for the same resulting force.

The first measuring means may be situated on a leading edge of the profile, where the maximum total pressure is found, equal to the sum of the static pressure and dynamic pressure. The second measuring means may be situated on one side of the profile. The second measuring means is advantageously situated in a region of the profile where the pressure coefficient Cp has a substantially maximum value where the negative pressure is at its greatest, and therefore the measured pressure is at a minimum. The pressure measured at this level is then referred to as the pseudo-static pressure. The pseudo-static pressure may thus be considered to be the pressure on the region of the profile where the negative pressure is at its greatest, and therefore the total pressure is at a minimum.

The present invention also relates to a propulsion unit, characterised in that it comprises a stub as described above.

Preferably, the stub has a substantially radial orientation with respect to the longitudinal axis of the propulsion unit and at least partly projects on an external surface of the nacelle of the propulsion unit. The measuring means may be situated in the vicinity of the radially external end of the stub.

The present invention also relates to a method for designing a stub as described above, characterised in that it comprises the steps consisting of:
  determining an aerodynamic profile of the stub, such as an NACA profile of the biconvex symmetrical type,
  positioning a first means of measuring a maximum pressure on the leading edge of the profile,
  determining by calculation the distribution of the pressure coefficient Cp along the profile and deducing therefrom the region of the profile where this coefficient has a substantially maximum value, and
  positioning a second means for measuring a minimum pressure in said region.

DESCRIPTION OF THE FIGURES

The invention will be better understood and other details, features and advantages of the invention will emerge from a reading of the following description by way of non-limitative example and with reference to the accompanying drawings, in which:

FIGS. 6 and 7 are highly schematic views in axial section of a discharge stub according to the invention, and illustrate two different positions of its drainage member; and FIG. 8 is a graph showing the change in the pressure coefficient Cp along a discharge stub having an NACA profile reproduced under the graph, a positive Cp corresponding to a negative pressure region and a negative Cp corresponding to an overpressure.

DETAILED DESCRIPTION

Figure 1:
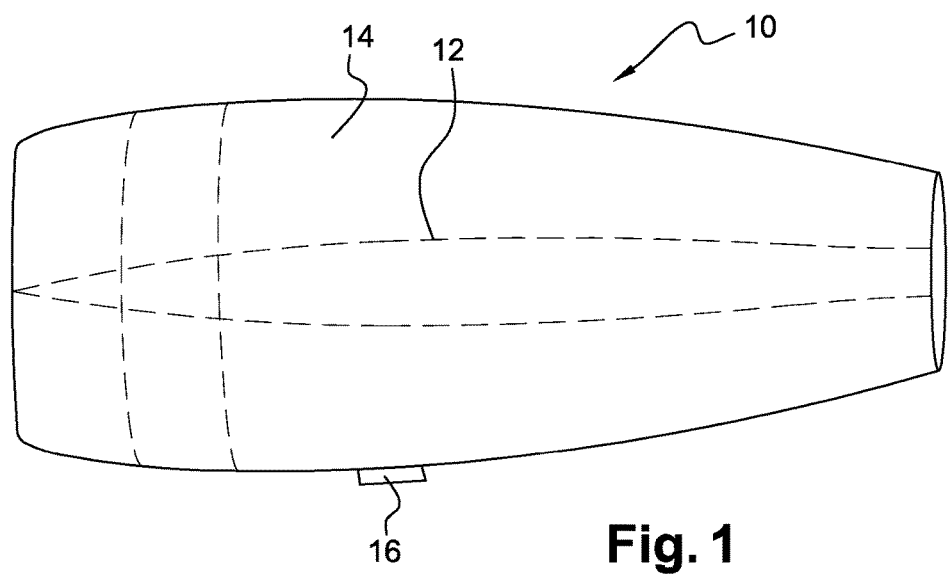
FIG. 1 is a schematic perspective view of an aircraft propulsion unit according to the invention.

Reference is made first of all to FIG. 1, which depicts an aircraft propulsion unit 10 comprising an engine 12 (such as a bypass turbojet engine, depicted schematically by broken lines) mounted inside a nacelle 14.

The engine 12 comprises, from upstream to downstream in the direction of flow of the gases (from left to right in the drawing), an air inlet, a fan, at least one compressor, a combustion chamber, at least one turbine and a duct for ejecting the combustion gases. The nacelle 14 comprises cowls that define the external surface of the propulsion unit.

The turbine engine 10 comprises a stub 16 for discharging drained fluids, this stub has a substantially radial orientation (with respect to the longitudinal axis of the propulsion unit) and projects on the external surface of the nacelle 14. It is situated at the bottom part of the propulsion unit, at 6 o'clock by analogy with the dial of a clock.

A plurality of types of fluid circulate in the turbine engine 10 and in particular fuel for supplying the chamber and the combustion of the gases, oil for lubricating the bearings of the rotating parts, and water, which may be aspirated by the ventilation scoops or formed by condensation on the engine.

In operation, these fluids are drained in order to prevent them accumulating and interfering with the functioning of the propulsion unit. The turbine engine comprises means for draining these fluids (such as drains) that are connected by fluid-conveying means such as ducts 18 to a box for retaining these fluids, which is here integrated in the discharge stub.

Figure 2:
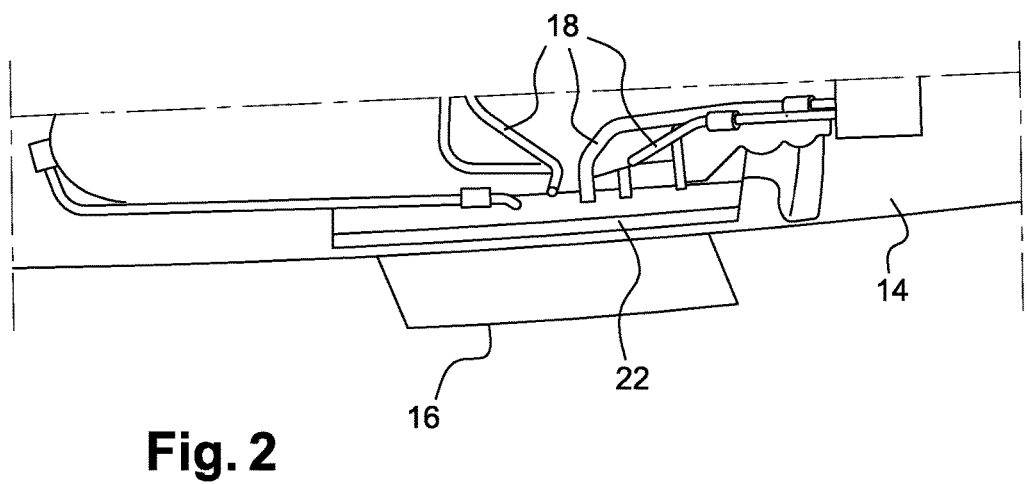
FIG. 2 is a partial schematic view in perspective and axial section of the propulsion unit of FIG. 1, to a larger scale.
Figure 3:
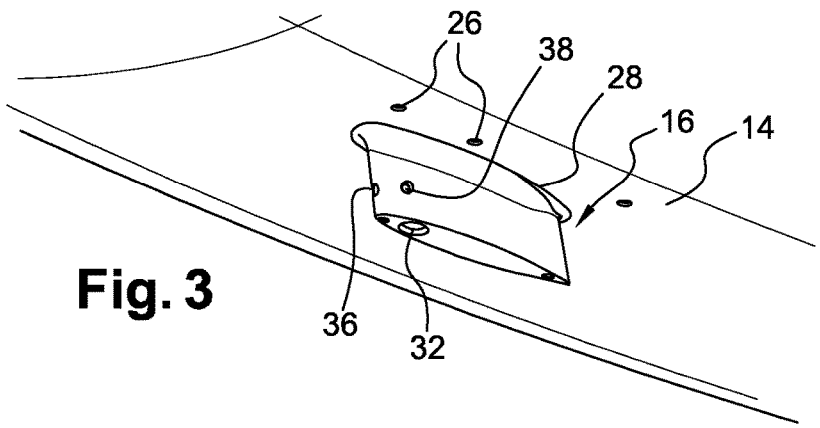
FIGS. 3 and 4 are schematic perspective views of a discharge stub according to the invention.
Figure 4:
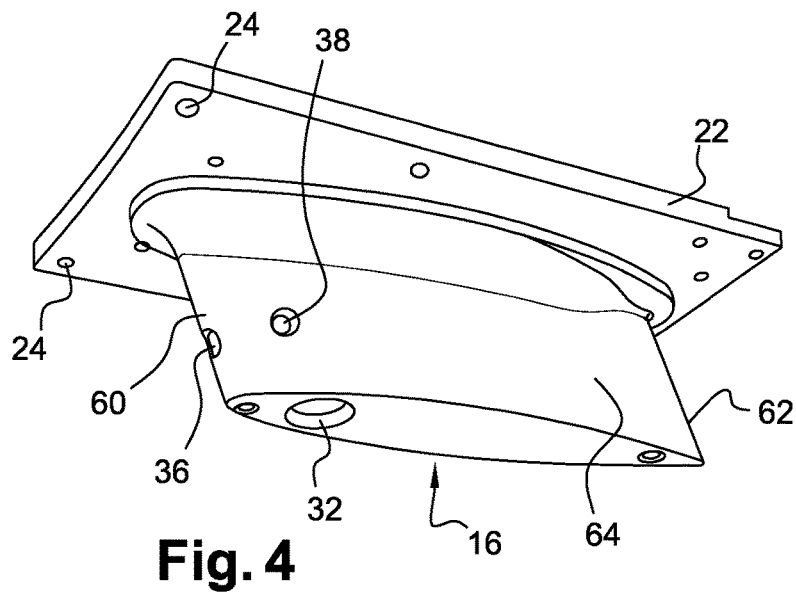

The discharge stub 16, more clearly visible in FIGS. 2 to 4, comprises, at its radially external end, a plate 22 for fixing to the nacelle 14.

The plate 22 has a substantially parallelepipidal shape and is fixed to cowls of the nacelle 14. It comprises orifices 24 aligned with orifices 26 on the nacelle for means of the screw and nut type to pass. The stub 16 has an aerodynamic profile and passes through a radial opening 28 in the nacelle. The stub 16 is mounted in this opening by radial translation towards the outside, from the inside of the nacelle, until the plate 22 bears on the internal surface of the nacelle. A seal may be provided, intended to be compressed between the plate and the nacelle.

The stub 16 further comprises an internal cavity 30 for storing the drained fluids.

Figure 5:
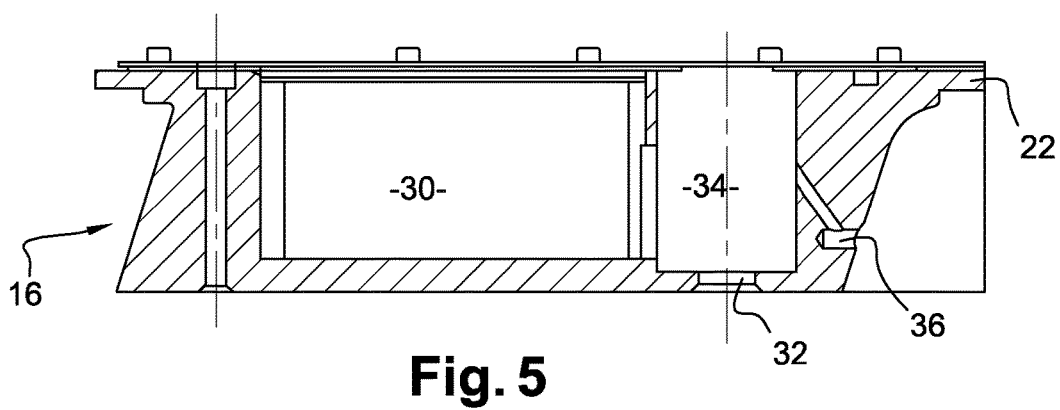
FIG. 5 is a schematic view in axial section of the discharge stub of FIGS. 3 and 4.

The plate 22 of the stub 16 comprises means for connecting outlets of the ducts 18 bringing the drained fluids to the cavity 30. These connection means comprise channels in which the outlets of the ducts 18 are fitted, the radially external ends of these channels emerging on the radially external surface of the plate 22, and their radially internal ends emerging in the cavity 30 (FIG. 5).

The cavity 30 may be put in fluid communication with an orifice 32 for discharging the fluids contained in this cavity, with a view to draining said cavity.

According to the invention, the drainage of the cavity 30 is carried out autonomously by means of a movable member, the actuation of which depends on the dynamic pressure outside the stub and therefore the velocity of the aircraft equipped with the propulsion unit.

The cavity 30 comprises a recess 34 for housing the member, which is able to move between a first position of closing the orifice 32 and a second position of releasing this orifice.

The stub 16 comprises means 36, 38 for measuring the dynamic pressure outside the stub, the member being intended to move from the first to the second position when the dynamic pressure is greater than, or equal to, a predetermined value.

In any fluid flow, a pressure difference is created between the stagnation pressure and the static pressure as soon as the fluid is in movement. In this case, this difference in pressure is applied to a surface of the member in order to generate sufficient force to activate the drainage of the stub as soon as the velocity of the aircraft exceeds a given threshold.

The dynamic pressure is equal to the difference between the total pressure and the static pressure. The means for measuring the pressure difference comprise a first means 36 for measuring the total pressure and a second means 38 for measuring the static (here pseudo-static) pressure.

These measuring means 36, 38 comprise here orifices or ducts emerging on the external surface of the stub 16. In the example embodiment in FIG. 5, the measuring means 36 comprises a duct comprising a first part, one end of which emerges on the external surface of the stub 16, this first part being connected to another part of the duct that is inclined with respect to the first part.

FIGS. 6 and 7 show highly schematically the functioning of the movable member, referenced 40.

The member 40 is here in the form of a piston able to move in the aforementioned recess 34, the piston comprising a rod 42 connected by one end to a transverse element such as a disc 44. The disc 44 separates the recess into two adjacent chambers 46, 48. The first measuring means 36 puts the first chamber 46 in fluid communication with the outside of the stub, and the second measuring means 38 puts the second chamber 48 in fluid communication with the outside of the stub. The first and second chambers 46 are thus subjected to the total and pseudo-static pressures respectively.

The rod 42, in moving, releases a passage for draining the fluids. By way of example, the rod 42 of the member 40 passes through a duct 50 connecting the cavity 30 to the discharge orifice 32, and comprises a through aperture 52 that must be positioned level with this duct so that the fluids contained in the cavity can flow as far as the orifice 32 and be discharged.

In the first position of the member 40 depicted in FIG. 6, its rod 42 closes off the duct 50 and thus prevents drainage of the cavity 30. In the second position of the member 40 depicted in FIG. 7, the aperture 52 of the rod 42 allows the fluids contained in the cavity 30 to pass until they are discharged through the orifice 32.

Resilient return means 54 are mounted in the recess and act on the member 40 in its first position. These means 54 here bear on the disc 44 of the member.

The expression of the dynamic pressure $P_d$ is $P_d = \rho \ast v^2/2$, in which:

$\rho$ is the mass per unit volume of the air, which decreases as the altitude increases; thus, at high altitude, drainage of the cavity 30 will occur at a higher velocity than at low altitude;

v is the velocity of the aircraft.

This dynamic pressure is equal to the difference between the total pressure and the static pressure, $P_d = P_t - P_s$.

The force $F_d$ that the dynamic pressure exerts on the member 40, and in particular on its disc 44, has the equation $F_d = S \ast \rho \ast v^2/2$, in which D is the surface area of application of the pressure, which is here the surface area of the disc 44.

The force $F_d$ represents the resistance to be chosen for the drainage and is sized according to the velocity threshold as from which the drainage is intended to occur, the aim being for the drainage to occur when the aircraft reaches a given velocity, for example when it takes off.

According to a preferred embodiment of the invention, the stub 16 has an aerodynamic profile of the NACA type, as can be seen in FIGS. 3 and 4 and at the bottom of FIG. 8, which shows a cross section of the stub. The profile of this stub is here symmetrical and biconvex, and comprises a leading edge 60 and a trailing edge 62 for the air, and convex profiled sides 64.

According to the invention and as can be seen in FIGS. 3 to 5, the first means 36 for measuring the total pressure is situated on the leading edge 60 of the stub, in the vicinity of its radially external end, in order to be at a distance from the limit layer on the external surface of the nacelle 14. The second means 38 for measuring the static pressure is situated on a side 64 of the stub, also in the vicinity of this radially external end.

Preferably, the second means 38 is used for measuring a pseudo-static pressure, this pseudo-static pressure being the pressure in a region of the profile where the negative pressure is at its greatest, that is to say where the pressure coefficient Cp has a maximum value Cpmax.

To determine this region and therefore the position of the second means 38, it is therefore necessary to know the distribution of this coefficient Cp along the profile of the stub. This can be done by calculation in order to obtain a curve as shown in the top part of FIG. 8. The second measuring means 38 is positioned at an abscissa X1 corresponding to the abscissa for which the pressure coefficient has a maximum value Cpmax.

The invention claimed is:

1. A stub for a propulsion unit, the stub configured for discharging drained fluids, said stub comprising a storage cavity for storing the drained fluids and at least one discharge orifice for discharging the drained fluids contained in the storage cavity, wherein the stub comprises elements for measuring a difference in pressure outside the stub and a member for draining the storage cavity, the member being able to move between a first position for closing the at least one discharge orifice and a second position for opening the at least one discharge orifice, the member being configured so as to move from the first to the second position when said difference in pressure is greater than, or equal to, a predetermined value; wherein the elements for measuring the difference in pressure outside the stub comprises a first orifice and a second orifice provided on an external surface of the stub.

2. The stub according to claim 1, wherein the first orifice is configured for measuring the total pressure outside the stub and the second orifice is configured for measuring the static or pseudo-static pressure outside the stub.

3. The stub according to claim 2, wherein the member is able to reciprocate in a recess in the stub and comprises or carries a transverse element separating two chambers inside the recess, a first chamber being fluidly connected to the first orifice and a second chamber being fluidly connected to the second orifice.

4. The stub according to claim 3, wherein the first orifice is fluidly connected to the first chamber by a duct comprising two parts, one of which is inclined or perpendicular with respect to the other.

5. The stub according to claim 1, wherein the stub has an aerodynamic profile.

6. The stub according to claim 5, wherein the first orifice is configured for measuring the total pressure outside the stub and the second orifice is configured for measuring the static or pseudo-static pressure outside the stub, and the first orifice is situated on a leading edge of the profile and the second orifice is situated on a side of the profile.

7. The stub according to claim 6, wherein the second orifice is situated in a region of the profile where a pressure coefficient Cp has a substantially maximum value.

8. The stub according to claim 1, wherein the stub has a substantially radial orientation with respect to the longitudinal axis of the propulsion unit and at least partly projects on an external surface of a nacelle of the propulsion unit, the first orifice and the second orifice being situated in the vicinity of the radially external end of the stub.

9. A method for designing the stub according to claim 1, wherein the method comprises the steps: —determining an aerodynamic profile of the stub, —positioning the first orifice on a leading edge of the profile, —determining by calculation the distribution of the pressure coefficient Cp along the profile and deducing therefrom a region of the profile where said pressure coefficient Cp has a substantially maximum value, and —positioning the second orifice in said region.

10. The stub according to claim 5, wherein the aerodynamic profile is a NACA profile of the biconvex symmetrical type.

11. The method according to claim 9, wherein the aerodynamic profile is a NACA profile of the biconvex symmetrical type.

* * * * *